(12) United States Patent
Taniguchi

(10) Patent No.: US 6,781,602 B2
(45) Date of Patent: Aug. 24, 2004

(54) DISPLAY DEVICE

(75) Inventor: Shinichi Taniguchi, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 345 days.

(21) Appl. No.: 09/752,692

(22) Filed: Jan. 3, 2001

(65) Prior Publication Data

US 2001/0006563 A1 Jul. 5, 2001

(30) Foreign Application Priority Data

Jan. 5, 2000 (JP) ........................................ 2000-005296

(51) Int. Cl.$^7$ .............................................. G06F 9/00
(52) U.S. Cl. ...................................................... 345/647
(58) Field of Search ................................. 345/647, 667, 345/670, 671, 611, 178

(56) References Cited

U.S. PATENT DOCUMENTS

| | | | | |
|---|---|---|---|---|
| 5,565,897 A | * | 10/1996 | Kikinis et al. | ............... 345/213 |
| 5,589,853 A | * | 12/1996 | Fujiki | .......................... 345/601 |
| 6,400,377 B1 | * | 6/2002 | Hiraka et al. | ................ 345/716 |
| 6,450,647 B1 | * | 9/2002 | Takeuchi | ..................... 353/69 |

FOREIGN PATENT DOCUMENTS

| | | |
|---|---|---|
| JP | 06253241 A | 9/1994 |
| JP | 08298627 | 11/1996 |
| JP | 09270979 A | 10/1997 |

OTHER PUBLICATIONS

Office Action to the corresponding Japanese application, dated Nov. 18, 2003, with translation.

* cited by examiner

Primary Examiner—Matthew C. Bella
Assistant Examiner—Huedung X. Cao
(74) Attorney, Agent, or Firm—Westerman, Hattori, Daniels & Adrian, LLP

(57) ABSTRACT

A CPU comprises means for receiving, when image deformation processing by a digital circuit is terminated, the degree of image deformation at the time of the termination from the digital circuit and storing the received degree of image deformation in a nonvolatile memory, and means for causing, when an image deformed state is returned to an initial state before the deformation by turning the power of a display device on or off, for example, the digital circuit to subject an input image to the image deformation processing until the degree of image deformation stored in the nonvolatile memory is reached on the basis of the degree of image deformation stored in the nonvolatile memory.

6 Claims, 3 Drawing Sheets

DISPLAY DEVICE

BACKGROUND OF THE INVENTION

1. Field of the Invention

The present invention relates generally to a display device, and more particularly, to a projection type display device such as a liquid crystal projector.

2. Description of the Prior Art

In a liquid crystal projector, an image displayed on a screen may, in some cases, be distorted depending on the positional relationship between a liquid crystal panel and the screen. In such a case, in order to correct the distortion of the displayed image, the displayed image is subjected to trapezoidal distortion correction. When it is desired to adjust the size of the image displayed on the screen, the displayed image is subjected to reduction/enlargement processing depending on the desire of a user.

Image deformation processing such as trapezoidal distortion correction processing or enlargement/reduction processing has been conventionally performed in the following manner. That is, the user enters an image deformation command such as a trapezoidal distortion correction command or an enlargement/reduction command using an UP key or a DOWN key by an input device such as a remote controller or a keyboard. The amount of trapezoidal distortion and the rate of enlargement change depending on a time period during which the key is pushed down.

A CPU sequentially calculates parameters relating to image deformation, that is, the amount of trapezoidal distortion, the rate of enlargement, and so forth depending on the command entered into the input device, and sets, every time the parameter relating to image deformation is calculated, the obtained parameter in a digital circuit such as a gate array. The gate array performs the image deformation processing on the basis of the set parameters.

In this method, the parameters relating to image deformation are managed by the CPU. Accordingly, the parameters finally set in the image deformation processing can be recorded on a nonvolatile memory or the like. Even if the circuit is returned to its initial state by turning the power off or on, therefore, it is possible to reproduce the same image deformed state as before by setting the parameters recorded on the nonvolatile memory in the gate array again.

In a method in which the CPU sequentially calculates the parameters depending on an UP key or DOWN key operation by the user, it takes certain time to calculate the parameters. Accordingly, the parameters are intermittently set in the gate array by the CPU, so that a deforming operation is awkward.

In order to solve this problem, when the command entered into the input device is directly set in the gate array, and the gate array calculates the parameters such as the amount of trapezoidal distortion and the rate of enlargement, a smooth image deforming operation can be performed irrespective of the performance of the CPU.

However, this method makes it impossible to reproduce, when the deformed state is returned to an initial state by turning the power off or on or switching a screen, for example, because the CPU does not manage the parameters, the same deformed state as before.

SUMMARY OF THE INVENTION

An object of the present invention is to provide a display device capable of performing a smooth image deforming operation as well as capable of reproducing the same deformed state as before when the deformed state is returned to an initial state by turning the power off or on or switching a screen, for example.

In a display device comprising a digital circuit for subjecting an input image to image deformation processing, an operating unit for entering an image deformation command, a CPU into which the image deformation command from the operating unit is entered, and a nonvolatile memory controlled by the CPU, the CPU continuing to transmit, when the image deformation command from the operating unit continues to be entered, the image deformation command to the digital circuit, the digital circuit sequentially making calculation for image deformation when the image deformation command continues to be transmitted from the CPU, to perform the image deformation processing such that the degree of image deformation is gradually increased, a first display device according to the present invention is characterized in that the CPU comprises means for receiving, when the image deformation processing by the digital circuit is terminated, the degree of image deformation at the time of the termination from the digital circuit, and storing the received degree of image deformation in the nonvolatile memory, and means for causing, when an image deformed state is returned to an initial state before the deformation by turning the power of the display device on or off, for example, the digital circuit to subject the input image to the image deformation processing until the degree of image deformation stored in the nonvolatile memory is reached on the basis of the degree of image deformation stored in the nonvolatile memory.

In a display device comprising a digital circuit for subjecting an input image to image deformation processing, an operating unit for entering an image deformation command, a control circuit into which the image deformation command from the operating unit is entered, and a nonvolatile memory controlled by the control circuit, the control circuit continuing to transmit, when the image deformation command from the operating unit continues to be entered, the image deformation command to the digital circuit, the digital circuit sequentially making calculation for image deformation when the image deformation command continues to be transmitted from the control circuit, to perform the image deformation processing such that the degree of image deformation is gradually increased, a second display device according to the present invention is characterized in that the control circuit comprises a circuit for receiving, when the image deformation processing by the digital circuit is terminated, the degree of image deformation at the time of the termination from the digital circuit, and storing the received degree of image deformation in the nonvolatile memory, and a circuit for causing, when an image deformed state is returned to an initial state before the deformation by turning the power of the display device on or off, for example, the digital circuit to subject the input image to the image deformation processing until the degree of image deformation stored in the nonvolatile memory is reached on the basis of the degree of image deformation stored in the nonvolatile memory.

An example of the digital circuit is one for subjecting the input image to trapezoidal distortion correction processing. In this case, the degree of image deformation is the amount of trapezoidal distortion.

An example of the display device is one for subjecting the input image to image enlargement/reduction processing. The degree of image deformation is the rate of image enlargement at the time of enlarging the image, while being the rate of image reduction at the time of reducing the image.

The foregoing and other objects, features, aspects and advantages of the present invention will become more apparent from the following detailed description of the present invention when taken in conjunction with the accompanying drawings.

DETAILED DESCRIPTION OF THE PREFERRED

Embodiments

Figure 1:
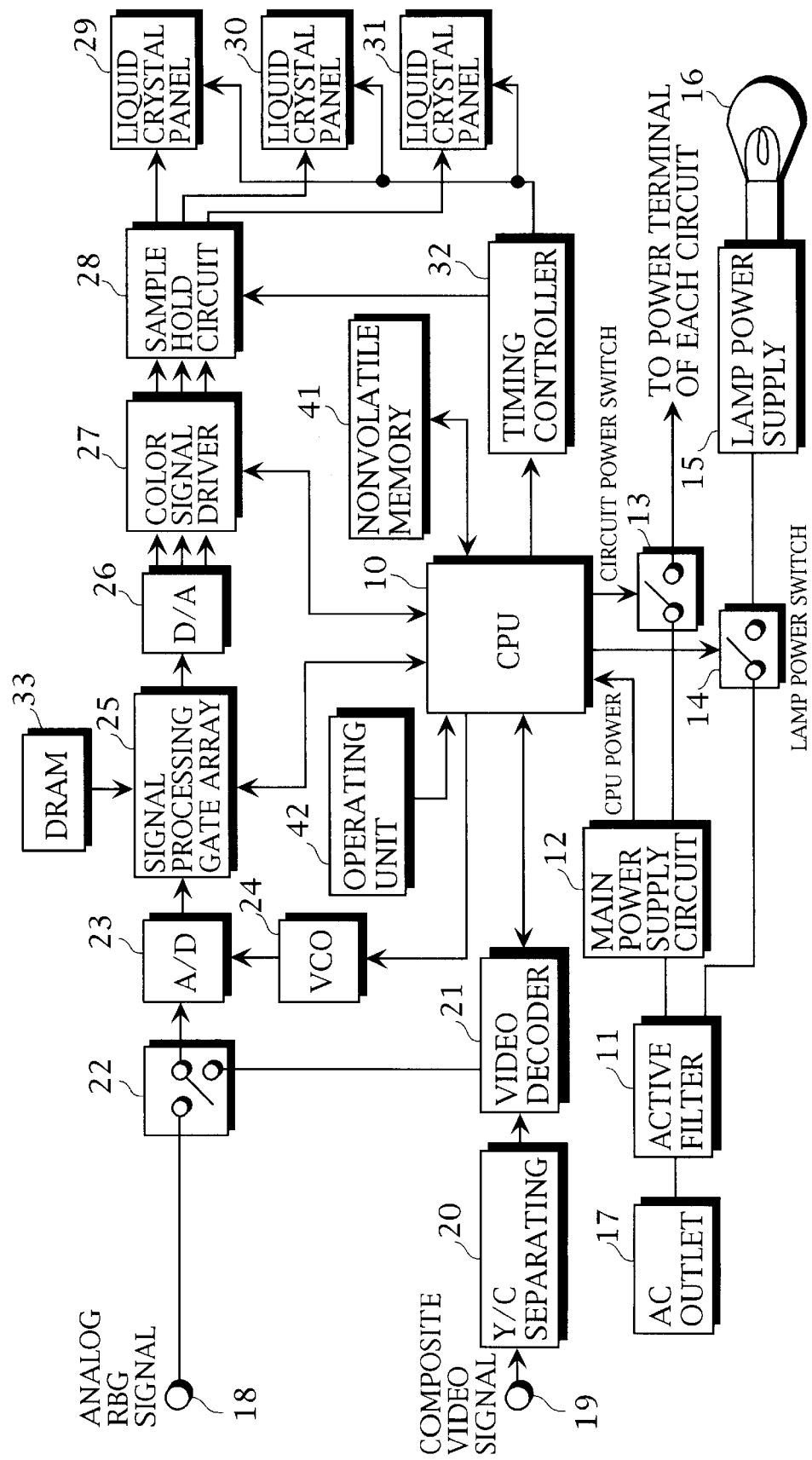
FIG. 1 is a block diagram showing the configuration of a liquid crystal projector.

Referring now to the drawings, embodiments of the present invention will be described.

FIG. 1 illustrates the configuration of a liquid crystal projector.

An AC voltage inputted from an AC outlet 17 is converted into a DC voltage by an active filter 11. The DC voltage obtained by the active filter 11 is sent to a main power supply circuit 12, and is also sent to a power supply circuit for lamps (hereinafter referred to as lamp power supply circuit) 15 through a power switch for lamps (hereinafter referred to as lamp power switch) 14.

The main power supply circuit 12 produces power for CPU (hereinafter referred to as CPU power) and power for circuits other than the CPU (hereinafter referred to as circuit power). The CPU power produced by the main power supply circuit 12 is supplied to a CPU 10. The circuit power produced by the main power supply circuit 12 is supplied to a power terminal of each of the circuits through a power switch for circuits (hereinafter referred to as circuit power switch) 13.

The lamp power switch 14 and the circuit power switch 13 are subjected to on-off control by the CPU 10. When the lamp power switch 14 is turned on, a voltage is applied to a lamp 16, so that the lamp 16 is turned on. When the circuit power switch 13 is turned on, the power is supplied to each of the circuits, thereby making it possible to judge the presence or absence of an image signal.

The CPU 10 comprises a nonvolatile memory 41 such as an EEPROM (Electrically Erasable and Programmable ROM) in addition to a storage device such as a ROM (not shown) storing a program and a storage device such as a RAM (not shown) storing necessary data. Further, a command from an operating unit 42 such as a remote control transmitter or a keyboard is entered into the CPU 10.

The liquid crystal projector comprises an analog RBG (Red, Blue, Green) input terminal 18 for inputting an analog RBG signal from a computer and an AV (Audio-Visual) input terminal 19 for inputting a composite video signal from a VCR (Video Cassette Recorder), a DVD (Digital Video Disc), or the like.

The analog RBG signal inputted to the analog RBG input terminal 18 is fed to a first input terminal of an input changing switch 22. The composite video signal inputted to the AV input terminal 19 is separated into a luminance signal and a chrominance signal by a Y/C separating circuit 20, and the luminance signal and the chrominance signal are inputted to a video decoder 21.

The CPU 10 receives the presence or absence of a signal, a color system, or the like from the video decoder 21, and transmits control data corresponding thereto to the video decoder 21. The video decoder 21 converts the input signal into an RBG signal and outputs the RBG signal. The RBG signal from the video decoder 21 is fed to a second input terminal of the input changing switch 22. The input changing switch 22 is controlled by the CPU 10.

A signal selected by the input changing switch 22 is fed to an A/D (Analog-to-Digital) converter 23. A VCO (Voltage Controlled Oscillator) 24 produces a sampling frequency corresponding to the input signal on the basis of the control data from the CPU 10, and outputs the produced sampling frequency to the A/D converter 23. The A/D converter 23 samples the input signal in synchronization with the sampling frequency inputted from the VCO 24, and outputs an obtained digital signal to a signal processing gate array 25.

A DRAM (Dynamic RAM) 33 stores on-screen display data for performing so-called on-screen display.

The signal processing gate array 25 switches the image data inputted from the A/D converter 23 and the on-screen display data stored in the DRAM 33, and feeds the data obtained by the switching to a D/A (Digital-to-Analog) converter 26.

The CPU 10 outputs, when a deformation command is entered from the operating unit 42, a control signal relating to the deformation of a displayed image to the signal processing gate array 25. In this case, the signal processing gate array 25 performs deformation processing of the displayed image on the basis of the control signal relating to the deformation of the displayed image from the CPU 10. When the deformation processing is performed by the signal processing gate array 25, the CPU 10 receives final parameters relating to the deformation from the signal processing gate array 25, and stores the received parameters in the nonvolatile memory 41.

The digital signal inputted to the D/A converter 26 is converted into an analog digital signal, and the analog digital signal is inputted to a color signal driver 27. The color signal driver 27 performs color signal correction such as brightness correction and conversion of a DC curve corresponding to the characteristics of a panel on the basis of the control data received from the CPU 10. A signal outputted from the color signal driver 27 is fed to a sample hold circuit 28, where it is subjected to sampling for being outputted to liquid crystal panels 29, 30, and 31.

Data are generally collectively written to the liquid crystal panels 29, 30, and 31 in units of six phases, that is, in units of six dots. Accordingly, the sample hold circuit 28 acquires and collectively outputs the data corresponding to six dots. The corresponding data are respectively fed to the liquid crystal panels 29, 30, and 31 for RGB from the sample hold circuit 28.

A timing controller 32 controls the timing of the sample hold circuit 28 and the timing of each of the liquid crystal panels 29, 30, and 31 on the basis of the control data received from the CPU 10.

[1] First Embodiment

A liquid crystal display device according to a first embodiment performs trapezoidal distortion correction processing as deformation processing.

Figure 2:
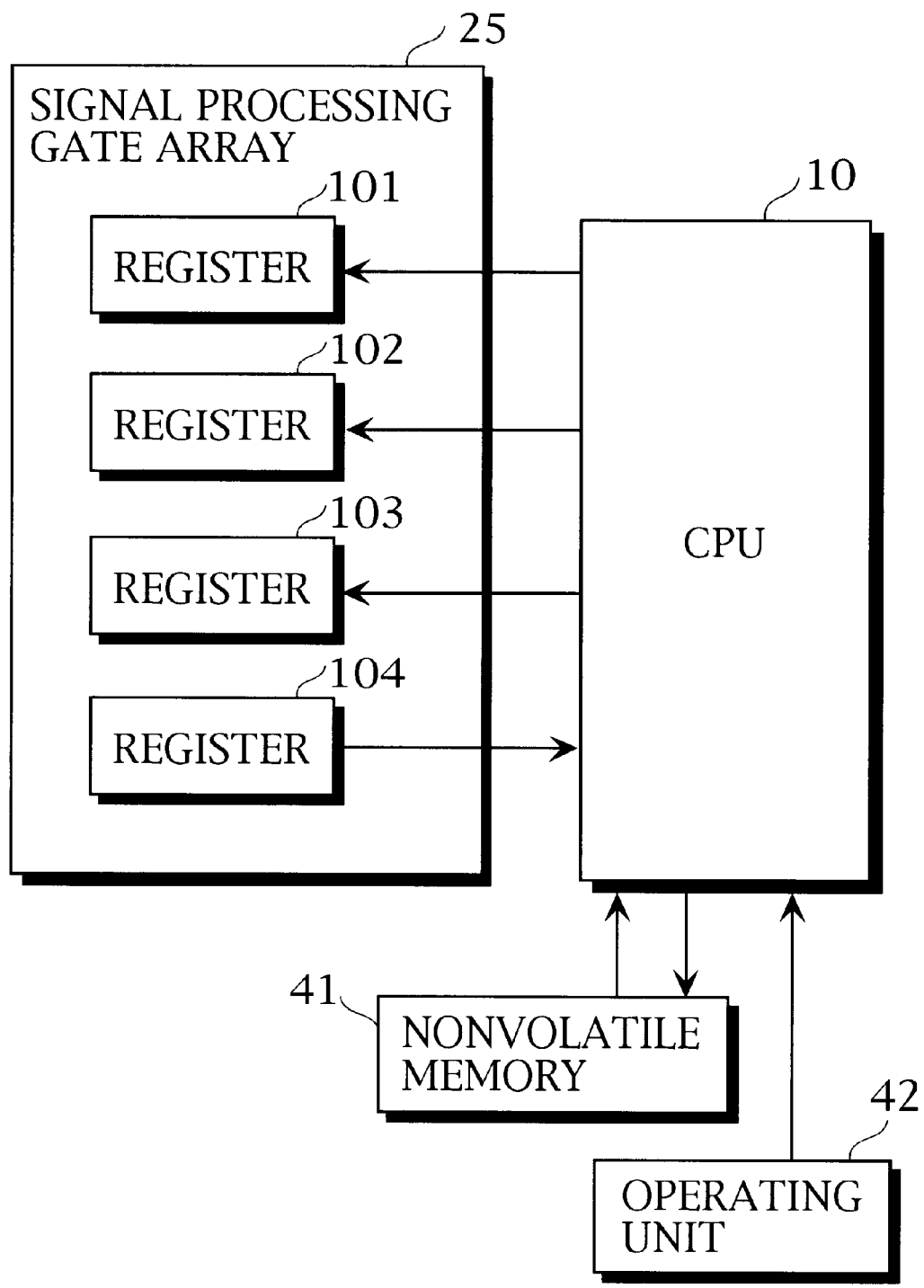
FIG. 2 is a block diagram showing the configuration of a circuit for performing trapezoidal distortion correction processing in a first embodiment.

FIG. 2 illustrates a circuit for performing trapezoidal distortion correction processing.

A circuit for performing trapezoidal distortion correction processing comprises a CPU 10 a nonvolatile memory 41, an operating unit 42, and a signal processing gate array 25.

The signal processing gate array 25 comprises first to fourth registers 101 to 104. Communication between the CPU 10 and the registers 101 to 104 in the signal processing gate array 25 is established through parallel bus lines.

A user enters a trapezoidal distortion correction command when it is desired to make trapezoidal distortion correction. The trapezoidal distortion correction includes upper trapezoidal distortion correction for reducing an upper part of an image in the horizontal direction and lower trapezoidal distortion correction for reducing a lower part of the image in the horizontal direction.

In this example, the operating unit 42 is provided with an UP key and a DOWN key. The UP key and the DOWN key shall be respectively used for inputting an upper trapezoidal distortion correction command and for inputting a lower trapezoidal distortion correction command. The amount of trapezoidal distortion (the width of reduction) shall increase in accordance with a length of time in which the UP key (or the DOWN key) is being pressed.

When the user presses the UP key or the DOWN key in the operating unit 42, the upper trapezoidal distortion correction command is entered into the CPU 10. When the upper trapezoidal distortion correction command is entered into the CPU 10, the CPU 10 transmits data for turning on a trapezoidal distortion correcting operation to the first register 101 in the signal processing gate array 25.

As described above, the trapezoidal distortion correction command includes the upper trapezoidal distortion correction command and the lower trapezoidal distortion correction command. Accordingly, trapezoidal distortion correction type identifying data indicating which of the upper trapezoidal distortion correction command and the lower trapezoidal distortion correction command is issued is fed to the first register 101 from the CPU 10.

Furthermore, the CPU 10 sets in the second register 102 the maximum value of the amount of trapezoidal distortion in the upper trapezoidal distortion correction which is determined by the performance of the signal processing gate array 25 when the upper trapezoidal distortion correction command is issued, while setting in the third register 103 the maximum value of the amount of trapezoidal distortion in the lower trapezoidal distortion correction which is determined by the performance of the signal processing gate array 25 when the lower trapezoidal distortion correction command is issued. The second register 102 is for setting the upper limit of the amount of trapezoidal distortion in a case where the upper trapezoidal distortion correction is made, and the third register 103 is for setting the upper limit of the amount of trapezoidal distortion in a case where the lower trapezoidal distortion correction is made.

The CPU 10 continues to transmit data for turning on an enlarging operation to the first register 101 while the UP key is being pressed.

The signal processing gate array 25 successively calculates parameters relating to trapezoidal distortion correction in accordance with contents set in the first register 101, to perform trapezoidal distortion correction processing on the basis of the calculated parameters. Further, the signal processing gate array 25 stores in the fourth register 104 trapezoidal distortion amount data representing the amount of trapezoidal distortion and trapezoidal distortion correction type identifying data indicating which of the upper trapezoidal distortion correction command and the lower trapezoidal distortion correction command is issued every time the parameter is calculated.

Such operations are continuously performed while the UP key or the DOWN key is being pressed. The parameters relating to the trapezoidal distortion correction are updated such that the amount of trapezoidal distortion gradually increases.

A user releases, at the time point where a displayed image is subjected to trapezoidal distortion correction until a desired amount of trapezoidal distortion is reached, an operation for pressing the UP key or the DOWN key. When the operation for pressing the UP key or the DOWN key is released, the CPU 10 transmits to the first register 101 data for turning off a trapezoidal distortion correcting operation. When the data for turning off a trapezoidal distortion correcting operation is transmitted to the first register 101, the signal processing gate array 25 terminates the trapezoidal distortion correction processing.

Furthermore, the CPU 10 receives the trapezoidal distortion amount data representing the final amount of trapezoidal distortion and the trapezoidal distortion correction type identifying data from the fourth register 104, and respectively stores the received data at predetermined addresses in the nonvolatile memory 41.

Thereafter, when the displayed image is returned to its initial state before the trapezoidal distortion correction by turning the power off or on, the CPU 10 reads out the trapezoidal distortion amount data and the trapezoidal distortion correction type identifying data which are respectively stored at the predetermined addresses in the nonvolatile memory 41 in order to reproduce the same state as before.

The CPU 10 stores the read trapezoidal distortion amount data in the second register 102 for setting the upper limit of the amount of trapezoidal distortion in the signal processing gate array 25 in the case of the upper trapezoidal distortion correction, while storing the data in the third register 103 for setting the upper limit of the amount of trapezoidal distortion in the signal processing gate array 25 in the case of the lower trapezoidal distortion correction.

In this state, the CPU 10 transmits to the first register 101 the data for turning on a trapezoidal distortion correcting operation. Further, the CPU 10 transmits to the first register 101 the trapezoidal distortion correction type identifying data read out of the nonvolatile memory 41.

The signal processing gate array 25 successively calculates the parameters relating to the trapezoidal distortion correction in accordance with the contents set in the first register 101, to perform the trapezoidal distortion correction processing on the basis of the calculated parameters. In this case, the upper limit of the amount of trapezoidal distortion is set in the second register 102 or the third register 103. Accordingly, the signal processing gate array 25 performs the trapezoidal distortion correction processing until the upper limit of the amount of trapezoidal distortion set in the second register 102 or the third register 103 is reached, to stop the trapezoidal distortion correcting operation.

In this case, the CPU 10 continues to transmit the data for turning on a trapezoidal distortion correcting operation during a time period required to make the trapezoidal distortion correction until the maximum value of the amount of trapezoidal distortion which is determined by the performance of the signal processing gate array 25 is reached, and then stops the transmission of the data for turning on a trapezoidal distortion correcting operation. As a result, it is possible to reproduce the same image enlarged state as before.

When it is desired to further make the trapezoidal distortion correction from the state, the user presses the UP key or the DOWN key depending on the type of the trapezoidal distortion correction. When the UP key or the DOWN key is pressed, the CPU 10 sets the maximum value of the amount of trapezoidal distortion which is determined by the performance of the signal processing gate array 25 in the second register 102 and the third register 103, respectively, in the case of the upper trapezoidal distortion correction and the lower trapezoidal distortion correction, and transmits to the first register 101 the data for turning on a trapezoidal distortion correcting operation until the press of the UP key or the DOWN key is released. Consequently, the signal processing gate array 25 performs the trapezoidal distortion correcting operation until the press of the UP key or the DOWN key is released.

[2] Second Embodiment

A liquid crystal display device according to a second embodiment performs enlargement/reduction processing as deformation processing.

Figure 3:
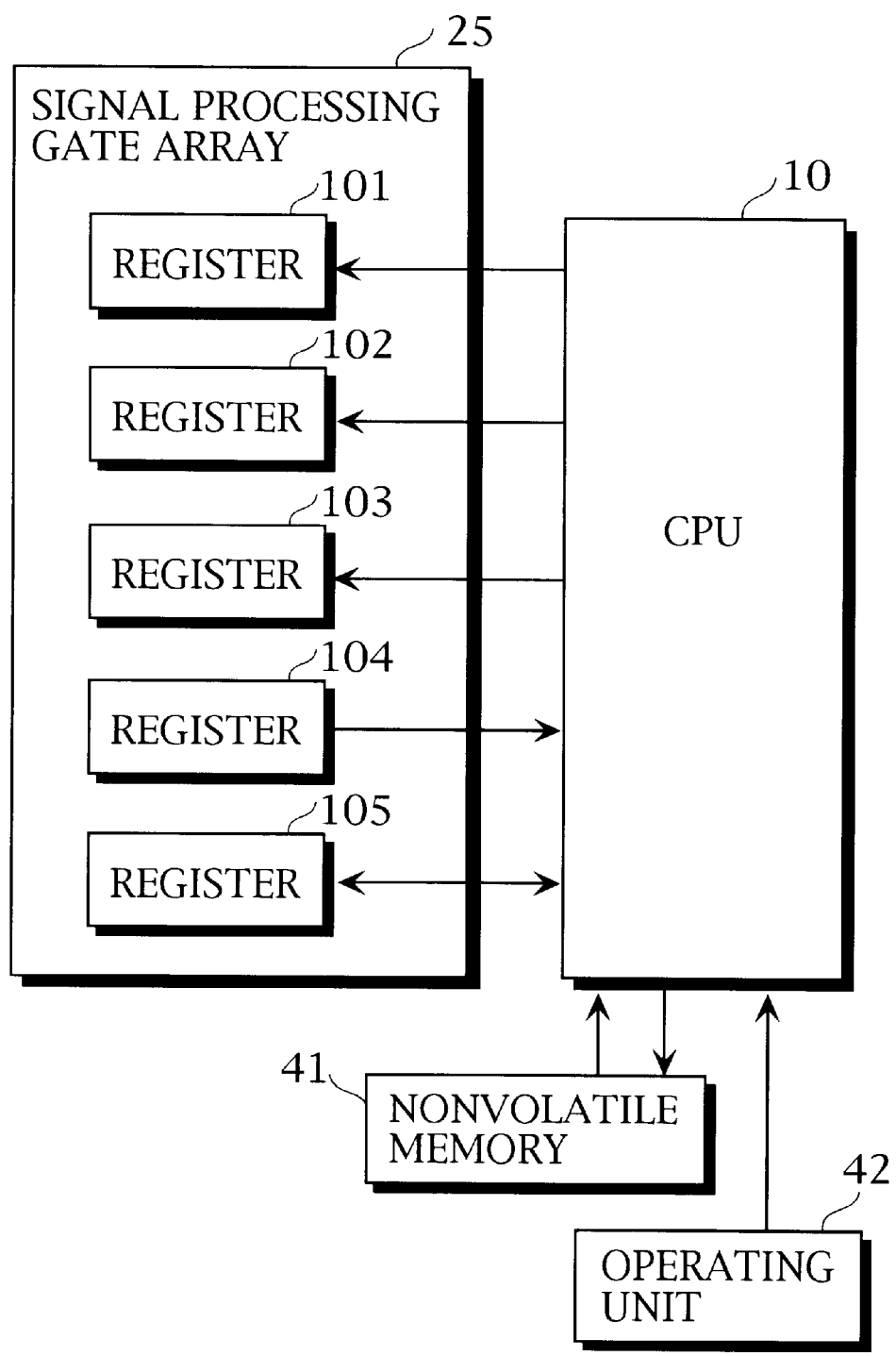
FIG. 3 is a block diagram showing the configuration of a circuit for performing enlargement/reduction processing in a second embodiment.

FIG. 3 illustrates a circuit for performing enlargement/reduction processing.

A circuit for performing enlargement/reduction processing comprises a CPU 10, a nonvolatile memory 41, an operating unit 42, and a signal processing gate array 25.

The signal processing gate array 25 comprises first to fifth registers 101 to 105. Communication between the CPU 10 and the registers 101 to 104 in the signal processing gate array 25 is established through parallel bus lines.

A user enters an image enlargement command when it is desired to enlarge an image, while entering an image reduction command when it is desired to reduce the image.

In this example, the operating unit 42 is provided with an UP key and a DOWN key. The UP key and the DOWN key shall be respectively used for inputting an image enlargement command and for inputting an image reduction command. The rate of image enlargement shall increase in accordance with a length of time in which the UP key is being pressed. It is assumed that the higher the rate of image enlargement becomes, the higher the degree of image enlargement becomes. The rate of image reduction shall decrease in accordance with a length of time in which the DOWN key is being pressed. It is assumed that the lower the rate of image reduction becomes, the higher the degree of image reduction becomes.

Operations in a case where the image enlargement command is entered will be first described.

The user designates, when it is desired to enlarge an image, center coordinates in the case of the enlargement (enlargement center coordinates) by a cursor or the like to enter the enlargement center coordinates, and enters the image enlargement command by pressing the UP key in the operating unit 42.

When the enlargement center coordinates and the image enlargement command are entered into the CPU 10, the CPU 10 transmits data for turning on an enlarging operation to the first register 101 in the signal processing gate array 25, and transmits enlargement center coordinate data representing the enlargement center coordinates to the fifth register 105.

The CPU 10 sets in the second register 102 the maximum value of the rate of image enlargement which is determined by the performance of the signal processing gate array 25. The second register 102 is for setting the upper limit of the rate of enlargement in a case where image enlargement processing is performed. The CPU 10 continues to transmit the data for turning on an enlarging operation to the first register 101 while the UP key is being pressed.

The signal processing gate array 25 successively calculates parameters relating to image enlargement in accordance with contents set in the first register 101 and the fifth register 105, to perform processing for enlarging a displayed image on the basis of the calculated parameters. Further, the signal processing gate array 25 stores in the fourth register 104 enlargement rate data representing the rate of enlargement every time the parameter is calculated.

Such operations are continuously performed while the UP key is being pressed. The parameters relating to the image enlargement are updated such that the rate of enlargement gradually increases.

The user releases, at the time point where the displayed image is enlarged to a desired rate of enlargement, an operation for pressing the UP key. When the operation for pressing the UP key is released, the CPU 10 transmits to the first register 101 data for turning off an enlarging operation. When the data for turning off an enlarging operation is transmitted to the first register 101, the signal processing gate array 25 terminates the image enlargement processing.

Furthermore, the CPU 10 receives the enlargement rate data representing the final rate of enlargement from the fourth register 104, and receives the enlargement center coordinate data from the fifth register 105. The received data are respectively stored at predetermined addresses in the nonvolatile memory 41.

Thereafter, when the displayed image is returned to its initial state before the enlargement processing by turning the power off or on, the CPU 10 reads out the enlargement rate data and the enlargement center coordinate data which are respectively stored at the predetermined addresses in the nonvolatile memory 41 in order to reproduce the same image enlarged state as before.

The CPU 10 sets the read enlargement rate data in the second register 102 for setting the upper limit of the rate of enlargement in the signal processing gate array 25. Further, the CPU 10 sets the read enlargement center coordinate data in the fifth register 105 in the signal processing gate array 25.

In this state, the CPU 10 transmits to the first register 101 the data for turning on an enlarging operation. The signal processing gate array 25 successively calculates the parameters relating to the image enlargement in accordance with the contents set in the first register 101 and the fifth register 105. In this case, the upper limit of the rate of enlargement is set in the second register 102. Accordingly, the signal processing gate array 25 performs the image enlargement processing until the upper limit of the rate of enlargement set in the second register 102 is reached, to stop the image enlarging operation.

In this case, the CPU 10 continues to transmit the data for turning on an enlarging operation during a time period required to perform the image enlargement processing until the maximum value of the rate of image enlargement which is determined by the performance of the signal processing gate array 25 is reached, and then stops the transmission of the data for turning on an enlarging operation. As a result, it is possible to reproduce the same image enlarged state as before.

When it is desired to further enlarge the image from the state, the user presses the UP key. When the UP key is pressed, the CPU 10 sets in the second register 102 the maximum value of the rate of image enlargement which is determined by the performance of the signal processing gate array 25, and transmits to the first register 101 the data for turning on an enlarging operation until the press of the UP key is released. Consequently, the signal processing gate array 25 performs an image enlarging operation until the press of the UP key is released.

Operations in a case where the image reduction command is entered will be then described.

The user designates, when it is desired to reduce an image, center coordinates in the case of the reduction (reduction center coordinates) by a cursor or the like to enter the reduction center coordinates, and enters the image reduction command by pressing the DOWN key in the operating unit 42.

When the reduction center coordinates and the image reduction command are entered into the CPU 10, the CPU 10 transmits data for turning on a reducing operation to the first register 101 in the signal processing gate array 25, and transmits reduction center coordinate data representing the reduction center coordinates to the fifth register 105.

The CPU 10 sets in the third register 103 the minimum value of the rate of image reduction which is determined by the performance of the signal processing gate array 25. The third register 103 is for setting the lower limit of the rate of reduction in a case where image reduction processing is performed. The CPU 10 continues to transmit the data for turning on a reducing operation to the first register 101 while the UP key is being pressed.

The signal processing gate array 25 successively calculates parameters relating to image reduction in accordance with contents set in the first register 101 and the fifth register 105, to perform processing for reducing a displayed image on the basis of the calculated parameters. Further, the signal processing gate array 25 stores in the fourth register 104 reduction rate data representing the rate of reduction every time the parameter is calculated.

Such operations are continuously performed while the DOWN key is being pressed. The parameters relating to the image reduction are updated such that the rate of reduction gradually decreases.

The user releases, at the time point where the displayed image is reduced to a desired rate of reduction, an operation for pressing the DOWN key. When the operation for pressing the DOWN key is released, the CPU 10 transmits to the first register 101 data for turning off a reducing operation. When the data for turning off a reducing operation is transmitted to the first register 101, the signal processing gate array 25 terminates the image reduction processing.

Furthermore, the CPU 10 receives the reduction rate data representing the final rate of reduction from the fourth register 104, and receives the reduction center coordinate data from the fifth register 105. The received data are respectively stored at predetermined addresses in the nonvolatile memory 41.

When the displayed image is then returned to its initial state before the reduction processing by turning the power off or on, the CPU 10 reads out the reduction rate data and the reduction center coordinate data which are respectively stored at the predetermined addresses in the nonvolatile memory 41 in order to reproduce the same image reduced state as before.

The CPU 10 sets the read reduction rate data in the third register 103 for setting the lower limit of the rate of reduction in the signal processing gate array 25. Further, the CPU 10 sets the read reduction center coordinate data in the fifth register 105 in the signal processing gate array 25.

In this state, the CPU 10 transmits to the first register 101 the data for turning on a reducing operation. The signal processing gate array 25 successively calculates the parameters relating to the image reduction in accordance with the contents set in the first register 101 and the fifth register 105. In this case, the lower limit of the rate of reduction is set in the third register 103. Accordingly, the signal processing gate array 25 performs the image reduction processing until the lower limit of the rate of reduction set in the third register 103 is reached, to stop the image reducing operation.

In this case, the CPU 10 continues to transmit the data for turning on a reducing operation during a time period required to perform the image reduction processing until the minimum value of the rate of image reduction which is determined by the performance of the signal processing gate array 25 is reached, and then stops the transmission of the data for turning on a reducing operation. As a result, it is possible to reproduce the same image reduced state as before.

When it is desired to further reduce the image from the state, the user presses the UP key. When the UP key is pressed, the CPU 10 sets in the third register 103 the minimum value of the rate of image reduction which is determined by the performance of the signal processing gate array 25, and transmits to the first register 101 the data for turning on a reducing operation until the press of the UP key is released. Consequently, the signal processing gate array 25 performs an image reducing operation until the press of the UP key is released.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In a projection display device comprising a digital circuit for subjecting an input image to image deformation processing, an operating unit for entering an image deformation command, a CPU into which the image deformation command from the operating unit is entered, and a nonvolatile memory controlled by the CPU, the CPU continuing to transmit, when the image deformation command from the operating unit continues to be entered, the image deformation command to the digital circuit, the digital circuit sequentially making calculation for image deformation when the image deformation command continues to be transmitted from the CPU, to perform the image deformation processing such that the degree of image deformation is gradually increased, the CPU comprising means for receiving, when the image deformation processing by the digital circuit is terminated, the degree of image deformation at the time of the termination from the digital circuit, and storing the received degree of image deformation in the nonvolatile memory, and means for causing, when an image deformed state is returned to an initial state before the deformation by turning the power of the projection display device on or off, the digital circuit to subject the input image to the image deformation processing until the degree of image deformation stored in the nonvolatile memory is reached on the basis of the degree of image deformation stored in the nonvolatile memory.

2. The projection display device according to claim 1, wherein the digital circuit subjects the input image to trapezoidal distortion correction processing, the degree of image deformation being the amount of trapezoidal distortion.

3. The projection display device according to claim 1, wherein the digital circuit subjects the input image to image enlargement/reduction processing, the degree of image deformation being the rate of image enlargement at the time of enlarging the image, while being the rate of image reduction at the time of reducing the image.

4. In a projection display device comprising a digital circuit for subjecting an input image to image deformation processing, an operating unit for entering an image deformation command, a control circuit into which the image deformation command from the operating unit is entered, and a nonvolatile memory controlled by the control circuit, the control circuit continuing to transmit, when the image deformation command from the operating unit continues to be entered, the image deformation command to the digital circuit, the digital circuit sequentially making calculation for image deformation when the image deformation command continues to be transmitted from the control circuit, to perform the image deformation processing such that the degree of image deformation is gradually increased, the control circuit comprising a circuit for receiving, when the image deformation processing by the digital circuit is terminated, the degree of image deformation at the time of the termination from the digital circuit, and storing the received degree of image deformation in the nonvolatile memory, and a circuit for causing, when an image deformed state is returned to an initial state before the deformation by turning the power of the projection display device on or off, the digital circuit to subject the input image to the image deformation processing until the degree of image formation stored in the nonvolatile memory is reached on the basis of the degree of image deformation stored in the nonvolatile memory.

5. The projection display device according to claim 4, wherein the digital circuit subjects the input image to trapezoidal distortion correction processing, the degree of image deformation being the amount of trapezoidal distortion.

6. The projection display device according to claim 4, wherein the digital circuit subjects the input image to image enlargement/reduction processing, the degree of image deformation being the rate of image enlargement at the time of enlarging the image, while being the rate of image reduction at the time of reducing the image.

* * * * *